United States Patent Office 3,178,854
Patented Apr. 20, 1965

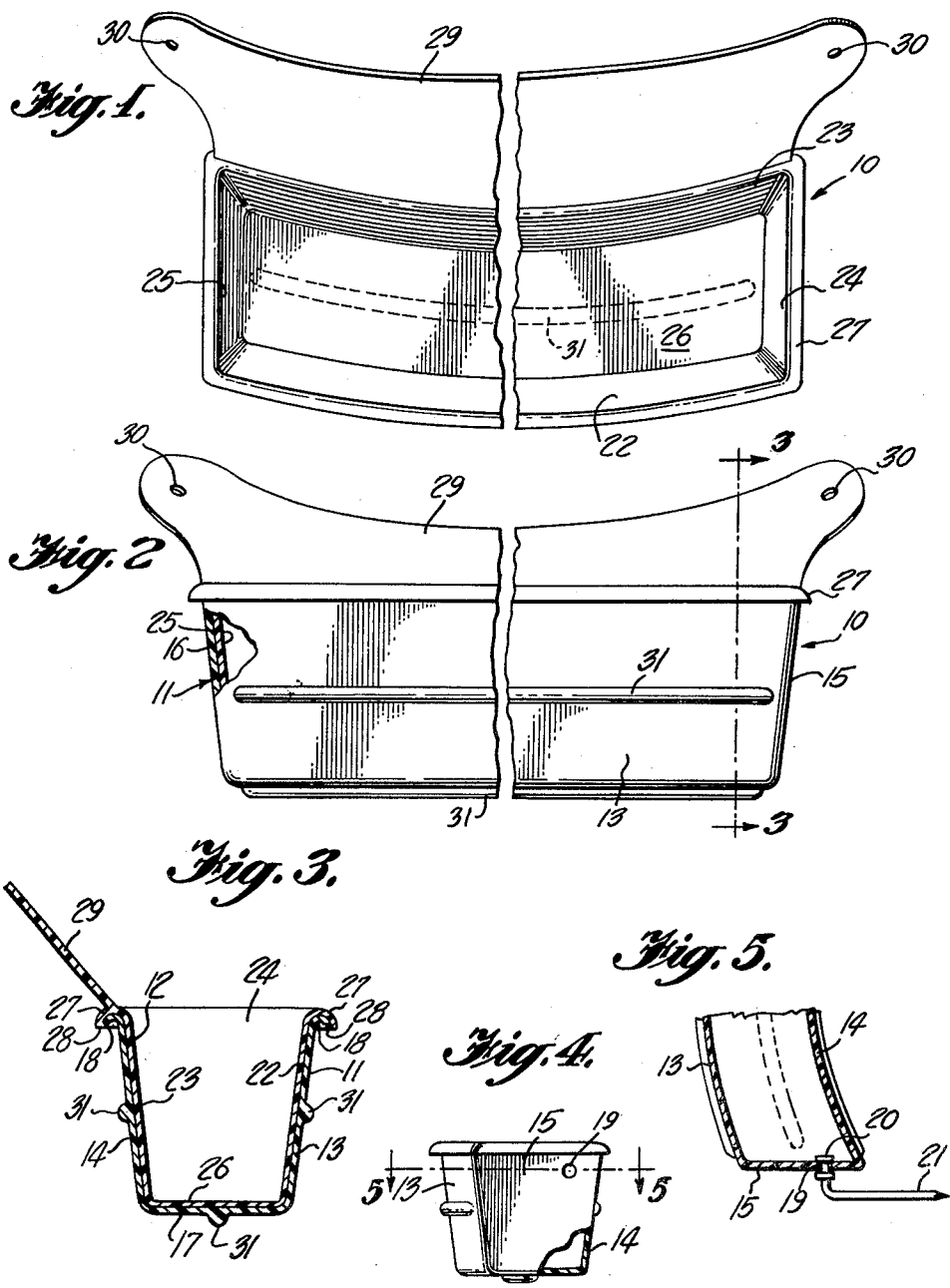

3,178,854
PLASTIC RECEPTACLE FOR COLLECTION AND PROCESSING OF TREE EXUDATES
William S. Barron, Jr., 1835 Weekirk St., Atlanta, Ga.
Substituted for abandoned application Ser. No. 783,574, Dec. 29, 1958. This application June 12, 1962, Ser. No. 203,688
4 Claims. (Cl. 47—11)

This invention relates to new and improved plastic receptacles for the collection of tree exudates, such as turpentine oleoresins, gums, sugar maple sap, latex, and the like. It further relates specifically to the collection and processing of turpentine oleoresins.

The receptacles presently in use for the collection of sap and gum exudates are generally made of metal, such as galvanized tin or aluminum. Such metal cups possess a number of serious disadvantages. The metal tends to oxidize and corrode due to exposure to the elements, such as air, sun, rain and conditions of high humidity, and to treatment with various cleaning compounds. The resulting metal oxides and salts contaminate the products with a deleterious effect on quality. In some instances, these metallic contaminants catalyze undesirable oxidation of organic components of the collected exudates, with resulting darkening and other degradative effects. In the case of the collection of turpentine oleoresins, it is current practice to treat the cut face of the tree with sulfuric acid to stimulate exudation rate. The acid reacts with the metal of the collection cups to form metal sulfate salts, which are so objectionable, that the oleoresin must be subjected to a preliminary washing to remove the salts prior to further processing.

The exudates, particularly those which are viscous and sticky tend to stick tenaciously to the metal so that they cannot be completely removed. Loss in this manner can be as high as 2% or more by volume in the case of oleoresins, gums, sugar maple sap and the like. Solvent removal of the residue is generally not feasible because of excessive metal contamination.

Metal cups tend to bend and warp, making it very difficult to attach them to the trees. They also frequently become embedded in the wood of the tree. When such trees are cut for lumber or paper making, the metal causes considerable damage to saws and chipper blades.

Earthenware cups are occasionally employed, but these have the disadvantages of being excessively heavy and frangible and of causing substantial loss of collected exudate which cannot be removed because of adhesion to the surfaces of the cup.

The object of this invention is to provide, for the collection of tree exudates, a strong, light, flexible, thin-walled receptacle made of a synthetic polymer, which can be inserted into the presently used metal or earthenware collection cups or into relatively rigid plastic containers.

Another object is the provision of strong, flexible, light, thin-walled synthetic polymer receptacles for the collection of tree exudates, which eliminate the problems of metallic contamination, and make possible substantially complete recovery of the collected exudate by virtue of reduced adhesion and ease of solution of residue without contamination.

Another object is the provision of flexible, thin-walled polyethylene receptacles for the collection of turpentine oleoresin exudates which can be processed with the oleoresin to provide a rosin product of improved properties.

Yet another object is to provide, in combination, a strong, flexible, light, thin-walled synthetic polymer receptacle inserted as a liner into a relatively rigid synthetic polymer cup, for the collection of tree exudates.

Other objects and advantages will become obvious from the detailed description of the drawings.

In the drawings:
FIGURE 1 is a top plan view of a plastic cup and liner assembly for collection of tree exudates embodying the present invention;
FIGURE 2 is a front elevation thereof;
FIGURE 3 is a vertical transverse section view thereof, taken along the line 3—3 of FIGURE 1;
FIGURE 4 is an end view of the liner supporting cup of the present invention; and
FIGURE 5 is a fragmentary horizontal section view illustrating the manner of assembly of nails with the liner supporting cup to mount the same on a tree.

Broadly speaking my invention comprises the fabrication of flexible, thin-walled receptacles which are of suitable dimensions for insertion into a relatively rigid supporting receptacle or cup in nested relation therein to serve as a liner for the cup. The liner receptacle is made of a nontacky, flexible synthetic polymer, such as polyethylene, a polyamide, e.g. nylon, a fluorinated hydrocarbon polymer, e.g. polytetrafluoroethylene (Teflon), polyvinyl chloride, and the like, which is compatible with the particular exudate to be collected, namely does not react chemically to form undesirable by-products. The liner receptacle is preferably, though not essentially, of such dimensions as to conform, at least approximately, to the shape and size of the liner supporting cup. It should be noted that the flexibility of the thin-walled liner renders the liner adaptable to be fitted into supporting cups having some variation in size or dimensions. The liner should preferably be provided with means, such as a flange or curved lip which fits over the top edge of the supporting cup to prevent contact of the exudate with the cup. The liner can also be provided with an apron-like extension projecting from a wall of the liner which will be adjacent the tree and extend above and beyond the top edge of the cup. This flexible extension can be securely fastened to the tree just below the exuding incision as an additional means for preventing contact of the exudate with the supporting cup.

The liner supporting cup, which is attached to the tree below the incision, and into which the plastic liner is inserted, should be relatively rigid to support the weight of the collected exudate without buckling. It can be made of the conventional metal or earthenware, since the most objectionable features of such cups are obviated by the plastic liner. The liner prevents contact with the metal, thereby preventing metallic contamination of the exudate. Adhesion of the exudate to the plastic liner walls is generally very much reduced as compared to adhesion to metal or earthenware, thereby increasing ease of exudate removal and yield. Furthermore, the light, flexible liner can be subjected to a solvent treatment for complete recovery of exudate without contamination of the exudate solution. The weight problem posed by heavy metal or earthenware cups is minimized, since they need not be manipulated for removal of the collected exudate. The filled liner can be lifted out of the cup, which can, if desired, be permitted to remain attached to the tree.

The liner supporting cup is preferably made of a synthetic polymer. Such plastic cups have the advantages of combined lightness and strength, and freedom from corrosion by weathering so that they can remain attached to the tree for indefinite periods without deterioration. Furthermore, should such plastic cups become embedded in the wood of the tree, no damage results if the tree is processed for lumber or papermaking.

The requisite strength and relative rigidity required to support the collected exudate can be achieved by adequate thickness of the plastic walls of the cup, reinforcement of the walls by means of such strengthening materials as fiberglass or other fibers, introduced into the plastic before molding, or applied in such a manner as to become an integral part of the plastic body, and by choice of a suitable polymer which is strong and relatively rigid. The polymer can be thermoplastic or thermosetting and includes such types as phenol-aldehydes, urea-aldehydes, polystyrene, polyvinylchloride, polyamides, polyethylene, polyacrylates and polymethacrylates, polytetrafluoroethylene, and the like.

One physical form of construction which this invention may advantageously assume is that illustrated in FIGURES 1 through 5 of the drawing. Referring to the drawing, wherein like reference characters designate corresponding parts throughout the several figures, the collecting receptacle of the present invention is an assembly of two principal components, the assembly being indicated generally by the reference character 10. This assembly comprises principally an upwardly opening supporting cup 11 and a removable liner 12 nested in the cup 11. The liner supporting cup 11 is preferably molded from a synthetic polymer material, and, in the preferred form herein shown, includes upwardly diverging side or front and rear walls 13, 14 respectively, end walls 15, 16 and a bottom 17 molded into an integral upwardly opening cup-shaped body. The front and rear walls 13, 14 may be curved slightly as illustrated in FIGURE 1 in such a way that the rear wall 14 presents a concavely curved surface to the side of the tree to which it is to be attached, and thereby conforms closely to the curvature of the adjacent tree surface. The cup is preferably formed with flanges or lips 18 along the upper edges of the side walls 13, 14 and end walls 15, 16, which lips are recurved or arched outwardly and then downwardly in the manner illustrated in FIGURE 3. While any convenient means may be employed to support the cup from the tree, one convenient form is illustrated in FIGURES 4 and 5 wherein the end walls 15, 16 of the cup 11 are provided with apertures 19 through which suitably formed heads 20 of plastic or plastic-coated pins 21 may be snapped and the pointed ends of the nails then driven into the tree to suspend the cup from the outer ends or heads 20 of the nails 21.

The liner 12 which, as previously described, is formed of flexible, thin-walled plastic material, is also formed with side walls 22, 23, end walls 24, 25 and bottom 26 conforming substantially to the configuration of the inner surface of the corresponding walls and bottom of the cup 11. Outwardly curving flanges or lips 27 extend entirely around the periphery of the liner at the upper edges of the side and end walls thereof and are provided with bead formations 28 at the outer end thereof whereby, when the liners are inserted in the cup 11, the bead formation 28 of the lips 27 will be snapped over the outer edges of the cup lips 18 and assist in frictionally holding the liner 12 in proper position within the cup 11. An upwardly and rearwardly inclined, apron-like extension 29 projects from the lip portion 27 of the liner along the rear wall 23 thereof, which is adapted to be secured to the tree at the upper corners of the extension 29 by pins extending through the openings 30 therein whereby the extension 29 forms an apron or chute-like member for guiding the tree exudate into the receptacle portion of the liner 12.

As previously mentioned, the liner supporting cup 11 will preferably be relatively more rigid than the liner 12 and may, for example, be formed of a fiberglass reinforced plastic material. Additional strengthening of the front and rear walls and bottom of the cup 11 may be achieved, where desired, by molding reinforced ribs, as indicated by the reference character 31 in these portions of the cup, although it will be understood that such integral reinforcing ribs are not essential to the invention in any way.

Polyethylene is particularly suitable for fabrication of the plastic liner 12. This polymer possesses properties which make it highly suitable for use in the collection of any type of tree exudate, in terms of excellent flexibility, toughness, moisture and corrosion resistance and chemical inertness.

I have found, in addition, that liners made of polyethylene having a melting point below 350°, and, preferably below 300° F., possess unique advantages when employed for the collection of turpentine oleoresins. The polyethylene liner can be processed with the oleoresin, thereby eliminating any need for removing the exudate from its receptacle. The polyethylene, which, after processing, remains in solid solution in the rosin, improves the rosin product. The rosin is markedly lighter in color and has a reduced melting point, properties which are very desirable in many areas of use, such as paper making. The polyethylene also increases the volume relative to the weight, which, in a number of applications, is a desirable improvement. The presence of the polyethylene, which normally comprises only about .005 to 2% by weight of the rosin because of the small amount by weight of the liner relative to the amount of collected exudate, normally is not objectionable and, in many cases is advantageous. In the few instances where its presence would be undesirable, it can be removed by mixing the rosin in hot molten form with a solvent which selectively dissolves the polyethylene or the rosin.

The turpentine oleoresin in the thin-walled polyethylene line 12, after removal from the liner supporting cup 11 mounted on the tree, can be processed in the same manner as the oleoresin itself, as, for example, in a conventional turpentine still.

It is now common practice in the turpentine industry, first to introduce the raw oleoresin in a closed melting vat, where it is heated to 350° F. with raw turpentine which acts as a solvent. The hot solution is dumped into a flash tank at atmospheric pressure in which about 75% of the turpentine flashes off and is carried away through condensers. The mixture of rosin and remaining turpentine is dropped through a long, vertical steel pipe, which functions as a distilling column, in counter current to steam at 350° F., which is forced up from the bottom. The remaining turpentine is thus steam distilled and drawn off from the top of the tube. The hot molten rosin collects and is drawn off from the bottom. A liquid waste sludge consisting of condensed steam, dirt, and various impurities, collects above the rosin and is tapped off.

This method, as well as any other conventional procedure, can be practiced by introducing the filled liners into the processing system without separating the polyethylene liner from the oleoresin contents thereof. The polyethylene melts and dissolves in the preliminary melting vat, passes with the rosin down through the steam distillation column and remains in solution in the rosin, which collects at the bottom of the still. The only condition essential for coprocessing of the polyethylene with the oleoresin is that the heat distillation be conducted at a temperature above the melting point of the polyethylene as well as the rosin. This can be achieved by proper adjustment of the distillation temperature or by selection of a polyethylene having a suitable melting point. It should be noted that the melting points of both the polyethylene and the rosin are lowered when in admixture. With conventional turpentine distillation practice, polyethylenes having a melting point below 350° F. and, preferably below about 300° F., are generally suitable.

As aforementioned, the resin product is substantially lighter than a similar product not processed with polyethylene. Although this lightening can in part be explained by the lighter color of the small amount of polyethylene present, this does not appear to be the sole factor. The polyethylene apparently induces improved separation of impurities during the steam distillation, as indicated by the substantially darker liquid waste sludge than is normally obtained in the absence of polyethylene. Still another factor which improves the color is the absence of metallic salts which contaminate the turpentine oleoresin normally collected in metal receptacles.

*Example 1*

Raw turpentine oleoresin containing 0.005 percent by volume polyethylene was melted at 370° F. The turpentine was flash distilled by reducing to atmospheric pressure. The hot molten rosin-polyethylene mix was subjected to distillation with steam at a temperature of 350° F. The rosin-polyethylene mixture, upon cooling, formed a product which was two points lighter in color as observed on a colorimeter scale, than the rosin product produced from the same raw turpentine olerosein processed in the same way. Then presence of a polyethylene could not be detected except by chemical analysis and had no adverse effect on the properties of the rosin.

Liners made of insoluble, high melting point plastics, such as Teflon, can also be employed in the collection of turpentine oleoresins with the advantages discussed above. Such liners containing the collected exudate can be introduced into the preliminary heating stage and screened out or otherwise separated from the hot molten or dissolved oleoresins. The liners can then be washed with solvent, such as raw turpentine, for complete recovery of the collected oleoresin.

My new plastic liners not only result in improved yields and freedom from contamination, but make possible substantial labor-saving as, for example, by reducing or completely eliminating the tedious, time-consuming task of removing the exudate from the collection cups and minimizing scouring and cleaning.

What is claimed is:
1. A sap collecting apparatus comprising a flexible thin-walled liner having front and rear side walls, end walls and a bottom, forming an upwardly opening receptacle, an inclined apron member integral with and projecting from and above the upper edge of said rear side wall adapted to engage a tree at the upper end of the apron member and guide tree exudate into the receptacle portion of the liner, the upper edges of said side and end walls being provided with outwardly projecting downwardly recurved beaded lip portions, and a supporting cup having side and end walls and a bottom, said cup walls having outwardly projecting lip portions at the upper edges thereof, said supporting cup being adapted to receive said liner in nested relation thereto, and said beaded lip portions being adapted to overlie and frictionally clasp said cup lip portions when the liner is snapped into the cup.

2. A sap collecting apparatus comprising a flexible thin-walled liner having front and rear side walls, end walls and a bottom, forming an upwardly opening receptacle, an inclined apron member apertured at its upper end and integral with and projecting from and above the upper edge of said rear side wall to be secured to a tree at said upper end and guide tree exudate into the receptacle portion of the liner, the upper edges of said side and end walls being provided with outwardly projecting downwardly recurved beaded lip portions, and a supporting cup to be shielded by the liner against contact with the tree exudate having side and end walls and a bottom, said cup walls having outwardly projecting lip portions at the upper edges thereof, said supporting cup being adapted to receive said liner in nested relation thereto, and said beaded lip portions being adapted to overlie and frictionally clasp said cup lip portions when the liner is snapped into the cup.

3. Sap collecting apparatus as defined in claim 1, wherein said liner is made of polyethylene.

4. Sap collecting apparatus as defined in claim 1, including a pair of nails having end portions extending at right angles to the remainder of the nails terminating in enlarged head formations, and said end walls of said cup having apertures adjacent upper rear regions of the end walls adapted to removably accommodate said head formations for supporting said cup from said nails when the latter are driven into a tree.

References Cited by the Examiner
UNITED STATES PATENTS

| | | | |
|---|---|---|---|
| 249,673 | 11/81 | Reynolds | 47—54 |
| 1,011,823 | 12/11 | L'Engle | 47—11 |
| 1,965,138 | 7/34 | Dunlap | 47—11 |
| 3,003,283 | 10/61 | Wilson | 47—11 |

FOREIGN PATENTS 757,500   10/33   France.

ABRAHAM G. STONE, *Primary Examiner.*